US008939530B2

(12) United States Patent
Goh

(10) Patent No.: US 8,939,530 B2
(45) Date of Patent: Jan. 27, 2015

(54) PIXEL DATA PROCESSING

(71) Applicant: Hewlett-Packard Development Company, L.P., Fort Collins, CO (US)

(72) Inventor: Guan-Kwee Goh, Vancouver, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 191 days.

(21) Appl. No.: 13/748,219

(22) Filed: Jan. 23, 2013

(65) Prior Publication Data

US 2014/0204139 A1 Jul. 24, 2014

(51) Int. Cl.
*B41J 2/07* (2006.01)
*G06K 15/02* (2006.01)

(52) U.S. Cl.
CPC . *B41J 2/07* (2013.01); *G06K 15/18* (2013.01); *G06K 15/181* (2013.01); *G06K 15/1814* (2013.01)
USPC .................................................. 347/9; 347/12

(58) Field of Classification Search
USPC ................. 347/5, 9, 12; 358/1.1, 1.8
See application file for complete search history.

(56) References Cited

U.S. PATENT DOCUMENTS

| 6,636,328 | B1 | 10/2003 | Pan et al. | |
|---|---|---|---|---|
| 7,061,644 | B2 | 6/2006 | Lapstun et al. | |
| 7,901,022 | B2 | 3/2011 | Nakanishi et al. | |
| 8,456,687 | B2 * | 6/2013 | Sato | 358/1.16 |
| 2009/0290183 | A1 | 11/2009 | Nakayama et al. | |

OTHER PUBLICATIONS

Lin et al., Orthogonal Rotation-Invariant Moments for Digital Image Processing, IEEE Transactions on Image Processing, vol. 17 No. 3, Mar. 2008, pp. 272-282.

* cited by examiner

*Primary Examiner* — Huan Tran
(74) *Attorney, Agent, or Firm* — Dicke, Billig & Czaja, PLLC; Patrick Gerard Billig

(57) ABSTRACT

A system includes a first memory to store pixel data, a first processing stage to process the pixel data in a nozzle axis major order to provide pre-aligned nozzle data, a second memory to store the pre-aligned nozzle data, a second processing stage to process the pre-aligned nozzle data in a print sweep axis major order to provide post-aligned nozzle data, a third memory to store the post-aligned nozzle data, and a third processing stage to process the post-aligned nozzle data in the nozzle axis major order to provide processed nozzle data.

15 Claims, 11 Drawing Sheets

500

| ADDRESS | RASTER WORDS | | | | |
|---|---|---|---|---|---|
| | 0 | 1 | | 15 | |
| NOZZLE | RB15 | RB14 | .... | RB0 | |
| 0 | Rb[0,15] | Rb[0,14] | | Rb[0,0] | |
| 1 | Rb[1,15] | Rb[1,14] | .... | Rb[1,14] | |
| ... | .... | ... | .... | .... | |
| 39 | Rb[39,15] | Rb[39,14] | .... | Rb[39,0] | |

| SUB SWING 0 | | SUB SWING 1 | | ... | SUB SWING 15 | | |
|---|---|---|---|---|---|---|---|
| ADDRESS | RASTER BYTE | ADDRESS | RASTER BYTE | .... | ADDRESS | RASTER BYTE | NOZZLE |
| 0 | Rb[0,0] | N | Rb[0,1] | .... | 15N | Rb[0,15] | 0 |
| 1 | Rb[1,0] | N+1 | Rb[1,1] | .... | 15N+1 | Rb[1,15] | 1 |
| 2 | R,b[2,0] | N+2 | Rb[2,1] | .... | 15N+2 | Rb[2,15] | 2 |
| ... | .... | .... | .... | .... | .... | .... | ... |
| 39 | Rb[39,0] | N+39 | Rb[39,1] | .... | 15N+39 | Rb[39,15] | 39 |
| ... | UNUSED | .... | UNUSED | .... | .... | UNUSED | |
| 63 | UNUSED | N+63 | UNUSED | .... | 15N+63 | UNUSED | |
| | | | | .... | | | |

Fig. 7B

| ADDRESS | DATA | | | ADDRESS | DATA | | |
|---|---|---|---|---|---|---|---|
| | COL | START NOZ | END NOZ | | COL | START NOZ | END NOZ |
| 0 | 0 | 0 | 63 | 256 | 0 | 128 | 150 |
| 8 | 1 | 0 | 63 | 264 | 1 | 128 | 150 |
| 16 | 2 | 0 | 63 | 272 | 2 | 128 | 150 |
| 24 | 3 | 0 | 63 | 280 | 3 | 128 | 150 |
| 32 | 4 | 0 | 63 | 288 | 4 | 128 | 150 |
| 40 | 5 | 0 | 63 | 296 | 5 | 128 | 150 |
| 48 | 6 | 0 | 63 | 304 | 6 | 128 | 150 |
| 56 | 7 | 0 | 63 | 312 | 7 | 128 | 150 |
| 64 | 8 | 0 | 63 | 320 | 8 | 128 | 150 |
| 72 | 9 | 0 | 63 | 328 | 9 | 128 | 150 |
| 80 | 10 | 0 | 63 | 336 | 10 | 128 | 150 |
| 88 | 11 | 0 | 63 | 344 | 11 | 128 | 150 |
| 96 | 12 | 0 | 63 | 352 | 12 | 128 | 150 |
| 104 | 13 | 0 | 63 | 360 | 13 | 128 | 150 |
| 112 | 14 | 0 | 63 | 368 | 14 | 128 | 150 |
| 120 | 15 | 0 | 63 | 376 | 15 | 128 | 150 |
| 128 | 0 | 64 | 127 | | | | |
| 136 | 1 | 64 | 127 | | | | |
| 144 | 2 | 64 | 127 | | | | |
| 152 | 3 | 64 | 127 | | | | |
| 160 | 4 | 64 | 127 | | | | |
| 168 | 5 | 64 | 127 | | | | |
| 176 | 6 | 64 | 127 | | | | |
| 184 | 7 | 64 | 127 | | | | |
| 192 | 8 | 64 | 127 | | | | |
| 200 | 9 | 64 | 127 | | | | |
| 208 | 10 | 64 | 127 | | | | |
| 216 | 11 | 64 | 127 | | | | |
| 224 | 12 | 64 | 127 | | | | |
| 232 | 13 | 64 | 127 | | | | |
| 240 | 14 | 64 | 127 | | | | |
| 248 | 15 | 64 | 127 | | | | |

Fig. 8

PIXEL DATA PROCESSING

BACKGROUND

An inkjet printing system may include a printhead, an ink supply that supplies liquid ink to the printhead, and an electronic controller that controls the printhead. The printhead ejects drops of ink through a plurality of nozzles or orifices toward a print medium, such as a sheet of paper, to print onto the print medium. Typically, the orifices are arranged in one or more columns or arrays such that properly sequenced ejection of ink from the orifices causes characters or other images to be printed upon the print medium as the printhead and the print medium are moved relative to each other. Prior to printing characters or other images upon the print medium, the character data or other image data is processed to sequence the ejection of ink from the orifices.

BRIEF DESCRIPTION OF THE DRAWINGS

FIG. 7A is a table illustrating one example of a hifipe raster word.

FIG. 7B is a table illustrating one example of orthogonal sub swing buffers.

FIG. 8 is a table illustrating one example of the format of a pre-aligned nozzle data swing buffer.

DETAILED DESCRIPTION

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined with each other, unless specifically noted otherwise.

Figure 1:
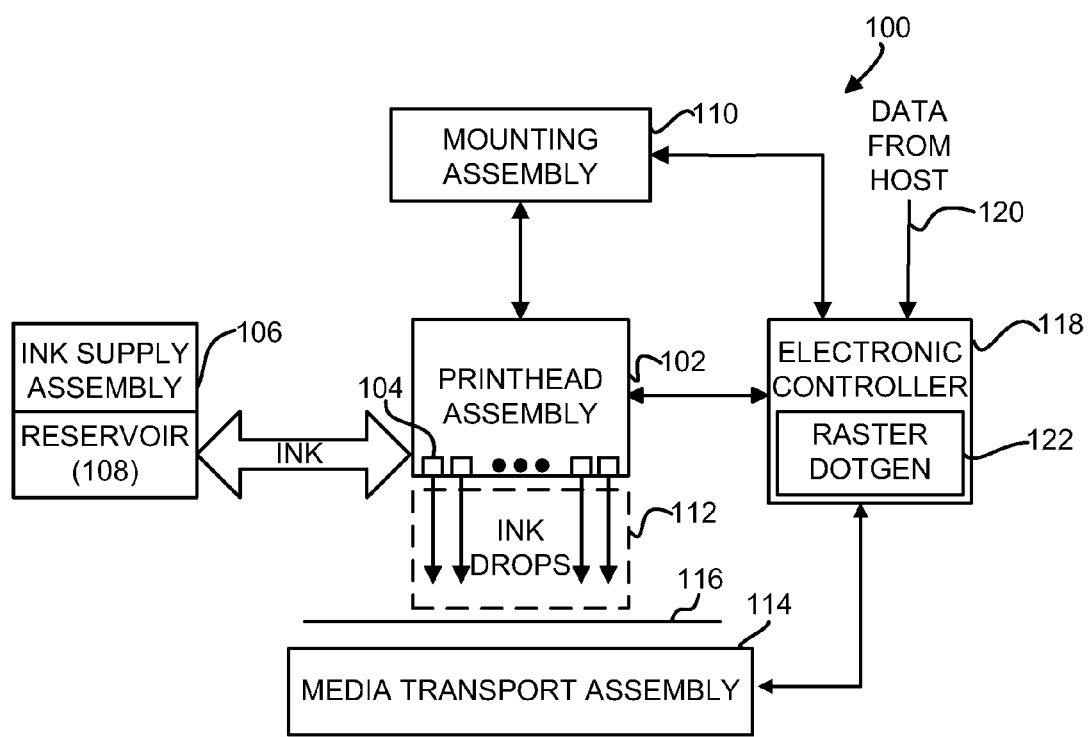
FIG. 1 is a block diagram illustrating one example of an inkjet printing system.

FIG. 1 is a block diagram illustrating one example of an inkjet printing system 100. Inkjet printing system 100 provides a fluid ejection system that includes a fluid ejection device, such as a printhead assembly 102. Inkjet printing system 100 also includes a fluid supply, such as an ink supply assembly 106, a mounting assembly 110, a media transport assembly 114, and an electronic controller 118. Electronic controller 118 includes raster dotgen 122, which processes pixel data and passes the processed data to a nozzle sequencer. The nozzle sequencer sequences the ejection of ink from orifices or nozzles.

Printhead assembly 102 ejects drops of ink, including one or more colored inks, through a plurality of orifices or nozzles 104. While the following disclosure refers to the ejection of ink from printhead assembly 102, in other examples other liquids, fluids, or flowable materials may be ejected from printhead assembly 102. In one example, printhead assembly 102 directs drops of ink toward a medium, such as print medium 116, to print onto print medium 116. Typically, nozzles 104 are arranged in one or more columns or arrays such that properly sequenced ejection of ink from nozzles 104 causes characters, symbols, and/or other graphics or images to be printed upon print medium 116 as printhead assembly 102 and print medium 116 are moved relative to each other.

Print medium 116 includes paper, card stock, envelopes, labels, transparent film, cardboard, rigid panels, or other suitable medium. In one example, print medium 116 is a continuous form or continuous web print medium, such as a continuous roll of unprinted paper.

Ink supply assembly 106 supplies ink to printhead assembly 102 and includes a reservoir 108 for storing ink. As such, ink flows from reservoir 108 to printhead assembly 102. In one example, ink supply assembly 106 and printhead assembly 102 form a recirculating ink delivery system. As such, ink flows back to reservoir 108 from printhead assembly 102. In one example, printhead assembly 102 and ink supply assembly 106 are housed together in an inkjet or fluidjet cartridge or pen. A plurality of pens may be combined to form a print bar. In another example, ink supply assembly 106 is separate from printhead assembly 102 and supplies ink to printhead assembly 102 through an interface connection, such as a supply tube.

Mounting assembly 110 positions printhead assembly 102 relative to media transport assembly 114, and media transport assembly 114 positions print medium 116 relative to printhead assembly 102. As such, a print zone 112 within which printhead assembly 102 deposits ink drops is defined adjacent to nozzles 104 in an area between printhead assembly 102 and print medium 116. Print medium 116 is advanced through print zone 112 during printing by media transport assembly 114.

In one example, printhead assembly 102 is a scanning type printhead assembly, and mounting assembly 110 moves printhead assembly 102 relative to media transport assembly 114 and print medium 116 during printing of a swath on print medium 116. In another example, printhead assembly 102 is a non-scanning type printhead assembly, and mounting assembly 110 fixes printhead assembly 102 at a prescribed position relative to media transport assembly 114 during printing of a swath on print medium 116 as media transport assembly 114 advances print medium 116 past the prescribed position.

Electronic controller 118 communicates with printhead assembly 102, mounting assembly 110, and media transport assembly 114. Electronic controller 118 receives data 120 from a host system, such as a computer, and includes memory for temporarily storing data 120. Typically, data 120 is sent to inkjet printing system 100 along an electronic, infrared, optical, or other suitable information transfer path. Data 120 represents, for example, a document and/or file to be printed. As such, data 120 forms a print job for inkjet printing system 100 and includes one or more print job commands and/or command parameters.

Electronic controller 118 includes raster dotgen 122. As used herein, the term "dotgen" is short for "dot generator." In one example, a dot generator is associated with a pen column. A dot generator generates "dots," which are binary firing states of the nozzles of the pen column. In another example, a dot generator is associated with a pen slot where the dot generator generates dots for both right and left pen columns. In yet another example, a dot generator is associated with partial pen columns in the case of interleaved Dual Drop Weight (DDW) pens. In yet another example, a dot generator is associated with tall pen columns that are separated into two or more logical pen columns.

In one example, electronic controller 118 including raster dotgen 122 provides control of printhead assembly 102 including timing control for ejection of ink drops from nozzles 104. As such, electronic controller 118 defines a pattern of ejected ink drops that form characters, symbols, and/or other graphics or images on print medium 116. Timing control and, therefore, the pattern of ejected ink drops, is determined by the print job commands and/or command parameters. In one example, logic and drive circuitry forming a portion of electronic controller 118 is located on printhead assembly 102. In another example, logic and drive circuitry forming a portion of electronic controller 118 is located off printhead assembly 102.

Raster dotgen 122 of electronic controller 118 is a hardware data pipeline for processing two dimensional images for printing. A two dimensional image may be processed in either a row major order or in a column major order. As used herein, the term "row major" is defined as along the print sweep axis, and the term "column major" is defined as the along the nozzle axis. The nozzle access is also known as the pen column axis. As used herein, the nozzle axis is vertical and the print sweep axis is orthogonal to the nozzle axis.

The decision between row major and column major processing of an input image affects the cost and efficiency of system resources such as memory storage and bandwidth, especially as the number of nozzles increases. The processing of an input image is further complicated by the orthogonal nature of the storage format of the input image relative to the orientation of the print bar. The processing of the input image includes a series of tasks, some of which are more efficient when processed along one axis and others of which are more efficient when processed along the other axis. Typically, large memory buffers are used to rotate or change the storage format for processing. Large memory buffers, however, are inefficient and only practical when the number of nozzles is low. Raster dotgen 122 addresses this by processing the input image in a hybrid order of processing by using small immediate hybrid storage formats and buffers so that the order of processing can be rapidly and efficiently changed for each task in the hardware data pipeline. In this way, the input image is efficiently and cost effectively processed.

Figure 2:
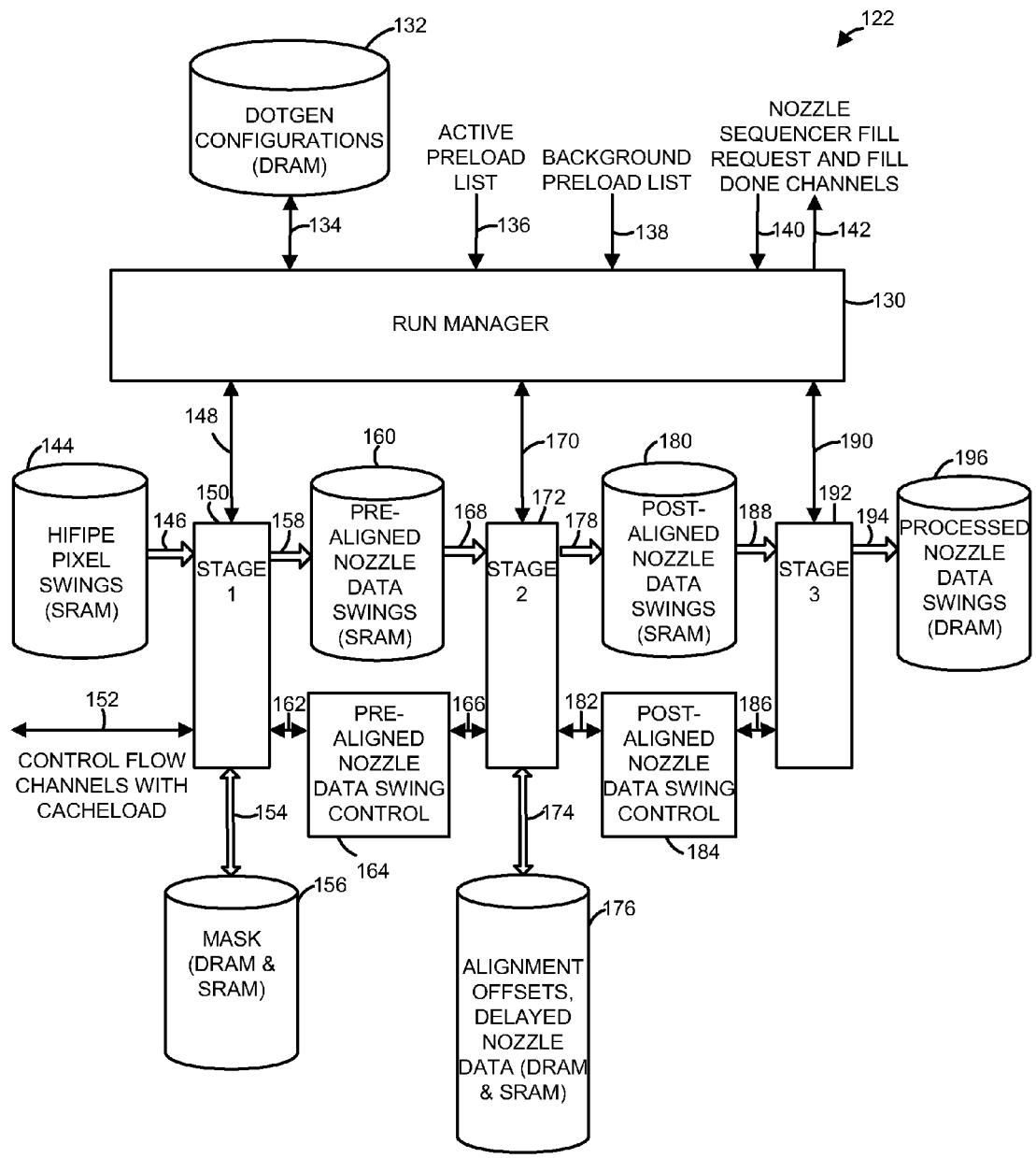
FIG. 2 is a block diagram illustrating one example of a raster dotgen.

FIG. 2 is a block diagram illustrating one example of raster dotgen 122. Raster dotgen 122 includes a run manager 130, a first processing stage 150, pre-aligned nozzle data swing control 164, a second processing stage 172, post-aligned nozzle data swing control 184, a third processing stage 192, and memories 132, 144, 156, 160, 176, 180, and 196. Run manager 130, first processing stage 150, pre-aligned nozzle data swing control 164, second processing stage 172, post-aligned nozzle data swing control 184, and third processing stage 192 are each circuits in the hardware data pipeline. In one example, run manager 130, memory 144, first processing stage 150, memory 160, pre-aligned nozzle data swing control 164, second processing stage 172, memory 180, post-aligned nozzle data swing control 184, and third processing stage 192 are part of an Application-Specific Integrated Circuit (ASIC).

Memory 132 is a Dynamic Random Access Memory (DRAM) for storing dotgen configurations. Memory 144 is a Static Random Access Memory (SRAM) for storing hifipe pixel data in hifipe pixel swings. As used herein, the term "hifipe pixel data" is rows of data for an image where each row of data has been preprocessed for halftoning and color matching. As used herein, the term "swings" refers to a swing buffer, which is a set of two buffers in a memory. One buffer (i.e., swing) is used for data consumption while the other buffer (i.e., swing) is used for data production. A swing buffer is useful when the order of consumption of data is not the same as the order of production of data. In one example, one of the swings of a swing buffer is designated as swing 0, and the other one of the swings is designated as swing 1.

Memory 156 includes DRAM and SRAM for storing mask data. Memory 160 is an SRAM for storing pre-aligned nozzle data in pre-aligned nozzle data swings. Memory 176 includes DRAM and SRAM for storing alignment offsets and delayed nozzle data. Memory 180 is an SRAM for storing post-aligned nozzle data in post-aligned nozzle data swings. Memory 196 is a DRAM for storing processed nozzle data in processed nozzle data swings.

Run manager 130 is communicatively coupled to memory 132 through a communication link 134 for receiving dotgen configurations from memory 132 and for updating dotgen configurations to memory 132. A dotgen configuration defines the attributes for a group of nozzles, such as a pen column. Run manager 130 receives an active preload list through a communication link 136. The active preload list contains the list of dotgens to be preloaded prior to executing a print sweep. Run manager 130 receives a background preload list through a communication link 138. The background preload list allows the preloading of the next print sweep while printing the current page. Run manager 130 receives nozzle sequencer fill requests through a communication link 140 and provides nozzle sequencer fill done messages through a communication link 142. Run manager 130 is communicatively coupled to first processing stage 150 through a communication link 148, to second processing stage 172 through a communication link 170, and to third processing stage 192 through a communication link 190 for passing control signals between run manager 130 and first processing stage 150, second processing stage 172, and third processing stage 192, respectively.

Memory 144 is communicatively coupled to first processing stage 150 through a communication link 146 for passing hifipe pixel data to first processing stage 150. First processing stage 150 exchanges flow control signals with a cacheload (not shown) through a communication link 152. The cacheload is a circuit used to populate the hifipe pixel swings in memory 144. First processing stage 150 is communicatively coupled to memory 156 through a communication link 154 for receiving mask data from memory 156. First processing stage 150 is communicatively coupled to memory 160 through a communication link 158 for passing data processed by first processing stage 150 to memory 160. First processing stage 150 is communicatively coupled to pre-aligned nozzle data swing control 164 through a communication link 162 for controlling the pre-aligned nozzle data swings in memory 160.

Memory 160 is communicatively coupled to second processing stage 172 through a communication link 168 for passing pre-aligned nozzle data to second processing stage 172. Second processing stage 172 is communicatively coupled to pre-aligned nozzle data swing control 164 through a communication link 166 for controlling the pre-aligned nozzle data swings in memory 160. Second processing stage 172 is communicatively coupled to memory 176 through a communication link 174 for receiving alignment offsets and delayed nozzle data from memory 176. Second processing stage 172 is communicatively coupled to memory 180 through a communication link 178 for passing data processed by second processing stage 172 to memory 180. Second processing stage 172 is communicatively coupled to post-aligned nozzle data swing control 184 through a communication link 182 for controlling the post-aligned nozzle data swings in memory 180.

Memory 180 is communicatively coupled to third processing stage 192 through a communication link 188 for passing post-aligned nozzle data to third processing stage 192. Third processing stage 192 is communicatively coupled to post-aligned nozzle data swing control 184 through a communication link 186 for controlling the post-aligned nozzle data swings in memory 180. Third processing stage 192 is communicatively coupled to memory 196 through a communication link 194 for passing data processed by third processing stage 192 to memory 196.

Raster dotgen 122 processes data in runs, where each run is a selected number of columns, such as 1280. For example, a run for a pen column having 768 nozzles produces 768*1280=983,040 dots. In operation, raster dotgen 122 begins processing data when run manager 130 receives a request message. The request message may come from the nozzle sequencer, the active preload list, or the background preload list. In one example, a request message from the active preload list has the highest priority, followed by a request message from the nozzle sequencer and then a request message from the background preload list. The background preload list may be enabled at the end of a print sweep. A dotgen identifier is associated with each request message. In response to a request message, run manager 130 uses the dotgen identifier to fetch the dotgen configuration associated with the dotgen identifier from memory 132 and pushes the appropriate fields of the dotgen configuration to first processing stage 150, second processing stage 172, and third processing stage 192.

The main data flow through raster dotgen 122 is indicated by communication links 146, 158, 168, 178, 188, and 194. The main data flow is from the hifipe pixel swings in memory 144 to the processed nozzle data swings in memory 196. The pixel data is processed as the data flows through first processing stage 150, second processing stage 172, and third processing stage 192.

In one example, first processing stage 150 performs rotation, resolution multiplication, and masking of the hifipe pixel data. After processing of the hifipe pixel data in first processing stage 150, the processed hifipe pixel data is stored as pre-aligned nozzle data in the pre-aligned nozzle data swings in memory 160. Second processing stage 172 fetches the pre-aligned nozzle data from memory 160 and performs nozzle alignment of the data. After nozzle alignment of the pre-aligned nozzle data in second processing stage 172, the processed pre-aligned nozzle data is stored as post-aligned nozzle data in the post-aligned nozzle data swings in memory 180. In one example, third processing stage 192 fetches the post-aligned nozzle data from memory 180 and performs nozzle splitting and dot counting. After nozzle splitting and dot counting of the post-aligned nozzle data in third processing stage 192, the processed post-aligned nozzle data is stored as processed nozzle data in the processed nozzle data swings in memory 196. The processed nozzle data is then passed to the nozzle sequencer for printing onto the print medium 116 (FIG. 1).

The pre-aligned nozzle data swings in memory 160 and the post-aligned nozzle data swings in memory 180 enable the order of the processing of the data to vary between first processing stage 150, second processing stage 172, and third processing stage 192. In first processing stage 150 and third processing stage 192, the order of processing of the data is nozzle axis major. With a vertical nozzle axis, first processing stage 150 and third processing stage 192 process the data in a column major order. In column major order processing, the data is processed from the first nozzle to the last nozzle of a pen column prior to moving to the next column, where processing again starts at the first nozzle.

In second processing stage 172, the order of the processing of the data is a hybrid of column major and row major. In one example, second processing stage 172 processes in row major order for a single nozzle for 16 columns before moving down to the next nozzle as follows:

{nozzle 0 : column 0, 1, 2, ...15}
{nozzle 1 : column 0, 1, 2, ...15}
{...}
{last nozzle : column 0, 1, 2, ...15}
{nozzle 0 : column 16, 17, 18, ...31}
{nozzle 1 : column 16, 17, 18, ...31}
{...}.

This order of processing is more efficient in terms of memory storage and bandwidth.

In one example, each nozzle is associated with 32 bits of delayed nozzle data and 8 bits of alignment offset, which are stored in memory 176. To process the pre-aligned nozzle data in second processing stage 172, the delayed nozzle data and alignment offsets are fetched to align one nozzle and then the delayed nozzle data is updated back to the memory. Therefore, for each nozzle, 72 bits of data are moved. If second processing stage 172 processed the data in column major format, the bandwidth needed to process at a rate of 1.4 Gdots/sec would be 100.8 Gbits/sec. By processing the data in the hybrid of column major and row major order as described above, however, the bandwidth is reduced by a factor of 16. This is because the 72 bits fetched may be used to generate 16 dots for one nozzle instead of one dot. In this way, the bandwidth is reduced to 6.3 Gbits/sec in this example. In one example, second processing stage 172 processes data in batches of 16 nozzles, such that nozzle 0 to nozzle 15 are processed in parallel and then nozzle 16 to nozzle 31 are processed in parallel.

The tasks performed by first processing stage 150 and third processing stage 192 are more efficient when processed in nozzle axis major order. For example, mask rotation, retrieval, and storage in first processing stage 150, and dot counting and nozzle splitting in third processing stage 192 are more efficient when processed in nozzle axis major order. In addition, in third processing stage 192, the processed nozzle data is written to memory 196 as parallel to the nozzle axis. With the order of processing differing between first processing stage 150 and second processing stage 172, and between second processing stage 172 and third processing stage 192, pre-aligned nozzle data swings in memory 160 and post-aligned nozzle data swings in memory 180 resolve the differences in the order of data production and consumption.

In addition to the main data flow, there is an auxiliary data flow as indicated by communication links 154 and 174. The auxiliary data flow is associated with masks, alignment offsets, and delayed nozzle data. Prior to starting the main data flow of a run, the mask, alignment offsets, and delayed nozzle data is fetched from DRAM and stored in SRAM. Once stored in SRAM, the SRAM is accessed for read and write operations during the duration of the run. At the end of a run, the delayed nozzle data is updated back to the DRAM. The mask and alignment offsets are not updated as they are read only. Therefore, the DRAM bandwidth associated with the auxiliary data flow is low. For example, a mask size of 768 nozzles by 64 bits is fetched once for a run length of 1280 data columns. In this example, a total of 768*1280=983,040 dots are processed. Accordingly, the overhead of fetching the mask is spread over an output of 983,040 dots or 0.5 bits per output dot.

Raster dotgen 122 may overlap two runs having different dotgen identifiers. For example, after first processing stage 150 finishes a first run, first processing stage 150 can process a second run while second processing stage 172 and third processing stage 192 are still processing the first run. Run manager 130 may fetch two dotgen configurations and push them into first processing stage 150, second processing stage 172, and third processing stage 192 independently as soon as the stages complete their runs.

In one example, however, runs of the same dotgen identifier cannot be overlapped as updating of the dotgen configuration and auxiliary data should be completed prior to the dotgen configuration being fetched again. In this example, run manager 130 prevents the overlapping of runs having the same dotgen identifier.

Figure 3:
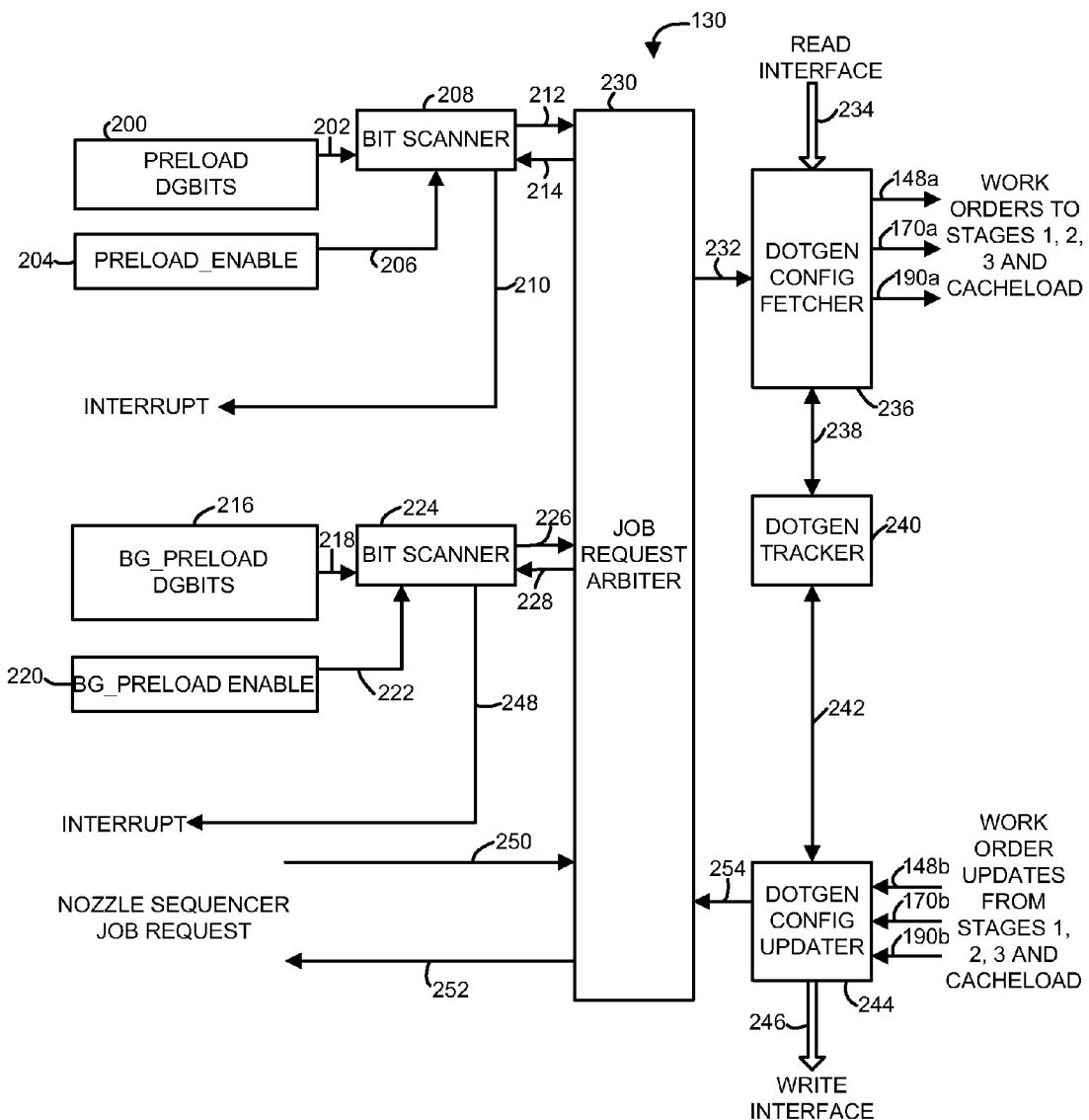
FIG. 3 is a block diagram illustrating one example of a run manager.

FIG. 3 is a block diagram illustrating one example of run manager 130. Run manager 130 includes a preload dgbits (i.e., dotgen bits) register 200, a preload enable bit 204, a bit scanner 208, a background preload dgbits register 216, a background preload enable bit 220, a bit scanner 224, a job request arbiter 230, a dotgen configuration fetcher 236, a dotgen tracker 240, and a dotgen configuration updater 244. Preload dgbits register 200 is communicatively coupled to bit scanner 208 through a communication link 202. Preload enable bit 204 is communicatively coupled to bit scanner 208 through a communication link 206. Bit scanner 208 is communicatively coupled to job request arbiter 230 through communication links 212 and 214 and provides an interrupt signal through a communication link 210.

Background preload dgbits register 216 is communicatively coupled to bit scanner 224 through a communication link 218. Background preload enable bit 220 is communicatively coupled to bit scanner 224 through a communication link 222. Bit scanner 224 is communicatively coupled to job request arbiter 230 through communication links 226 and 228 and provides an interrupt signal through a communication link 248. Job request arbiter 230 receives nozzle sequencer job request messages through a communication link 250 and provides nozzle sequencer job complete messages through a communication link 252. Job request arbiter 230 is communicatively coupled to dotgen configuration fetcher 236 through a communication link 232 and to dotgen configuration updater 244 through a communication link 254.

Dotgen configuration fetcher 236 receives dotgen configurations through read interface 234. In one example, read interface 234 is an AXI read interface. Dotgen configuration fetcher 236 provides work orders to first processing stage 150, second processing stage 170, and third processing stage 192 through communication links 148a, 170a, and 190a, respectively. In addition, dotgen configuration fetcher 236 provides work orders to the cacheload. Dotgen configuration fetcher 236 is communicatively coupled to dotgen tracker 240 through a communication link 238. Dotgen tracker 240 is communicatively coupled to dotgen configuration updater 244 through a communication link 242. Dotgen configuration updater 244 receives work order updates from first processing stage 150, second processing stage 170, and third processing stage 192 through communication links 148b, 170b, and 190b, respectively. In addition, dotgen configuration updater 244 receives work order updates from the cacheload. Dotgen configuration updater 244 updates dotgen configurations through write interface 246. In one example, write interface 246 is an AXI write interface.

Run manager 130 fetches the dotgen configurations for each run and then initiates the first processing stage 150, the second processing stage 172, the third processing stage 192 (FIG. 2), and the cacheload to start processing. In addition, run manager 130 updates the fields in the dotgen configuration after the processing of a run is complete.

Preload dgbits register 200 is used to configure which dotgens of the current print sweep are to be preloaded. As used herein, the tem "preloaded" refers to the generation of two nozzle data swings worth of nozzle data prior to enabling the nozzle sequencer to read in the nozzle data, sequence the nozzle data, and send the nozzle data to the pens. In one example, preload dgbits register 200 has a length of 254 bits or another suitable length. Each bit of preload gdbits register 200, when set to 1, indicates that that dotgen is to be preloaded. For example, if a bit "n" of preload dgbits register 200 is set, then the dotgen "n" will be preloaded. Background preload dgbits register 216 is similar to preload dgbits register 200, except that background preload dgbits register 216 is used for background preloading for the next print sweep. The background preload dgbits register 216 may be loaded at any time during the current print sweep, prior to the current print sweep, or after the current print sweep.

When the preload enable bit 204 is set, bit scanner 208 scans the preload dgbits register 200 and sends a job request to job request arbiter 230 through communication link 212. The job request from bit scanner 208 includes a dotgen identifier (e.g., 8 bits) and an indicator bit to indicate whether the request is associated with the current print sweep or the next print sweep. Bit scanner 208 generates an interrupt once the dotgens are preloaded.

Likewise, when the background preload enable bit 220 is set, bit scanner 224 scans the background preload dgbits register 216 and sends a job request to job request arbiter 230 through communication link 226. In one example, background preload dgbits register 216 has a length of 254 bits or another suitable length. The job request from bit scanner 224 includes a dotgen identifier (e.g., 8 bits) and an indicator bit to indicate whether the request is associated with the current print sweep or the next print sweep. Bit scanner 224 generates an interrupt once the dotgens are preloaded.

A job request can also be sent to job request arbiter 310 from the nozzle sequencer through communication link 250. The job request from the nozzle sequencer includes a dotgen identifier (e.g., 8 bits) and an indicator bit to indicate whether the request is associated with the current print sweep or the next print sweep. In one example, a job request from bit scanner 208 and a job request from the nozzle sequencer will set the indicator bit to 0 while a job request from bit scanner 224 will set the indicator bit to 1.

Job request arbiter 230 selects one of the three job requests and sends the selected job request to dotgen configuration fetcher 236. Job request arbiter 230 selects one of the three job requests based on a first priority, a second priority, and a third priority. The first priority is given to current print sweep preload job requests. In one example, there is a maximum of two waves of job requests in preload, where a wave is a series of job requests. The second priority is given to nozzle sequencer job requests. A wave of job requests will come from the nozzle sequencer as the nozzle sequencer crosses a run length boundary (e.g., one inch). The third priority is given to background preload job requests.

In one example, there is a threshold count register that prevents any background preload from occurring until a certain number of preload and nozzle sequencer job requests have been processed. The threshold count register may be used to allow background processing after the last wave of nozzle sequencer job requests. In one example, for a run length set to one inch, the last wave of processing should be completed one inch away from the end of the print zone.

Each job request of a wave of job requests is associated with a dotgen and may be intermixed with another wave of job requests from another source since job request arbiter 230 processes job requests on a dotgen by dotgen basis. A lower priority wave of job requests may be interrupted by a higher priority wave of job requests.

After arbitration, the job requests are sent to dotgen configuration fetcher 236. Dotgen configuration fetcher 236 then probes dotgen tracker 240 to determine whether the dotgen configuration has already been fetched and is in queue for processing, in processing, or in the process of being updated into the DRAM. If the dotgen configuration has already been fetched, the dotgen configuration will not be fetched again until the dotgen configuration has been updated into the DRAM.

In one example, dotgen tracker 240 also limits the number of dotgen configurations that are fetched, in processing, or in the process of being updated to a maximum of two. Since the run length processing time is longer than the time to fetch the dotgen configurations, two dotgen configurations are sufficient to hide the fetching of the dotgen configurations.

After a dotgen configuration is fetched by dotgen configuration fetcher 236, the dotgen configuration is distributed as work orders to first processing stage 150, second processing stage 172, third processing stage 192 (FIG. 2), and the cacheload. Initially, first processing stage 150, second processing stage 172, third processing stage 192, and the cacheload will accept the work order at the same time. Later, however, first processing stage 150 and the cacheload will accept the work order earlier than second processing stage 172. Likewise, second processing stage 172 will accept the work order earlier than third processing stage 192. In one example, the lag between first processing stage 150 and third processing stage 192 is 64 data columns. In one example, the lag between the cacheload and the first processing stage 150 is the width of the hifipe raster words, which are described below with reference to FIG. 7A. In any case, the total lag is less than a run length of one inch.

As a work order is completed, dotgen configuration updater 244 receives the updated fields from first processing stage 150, second processing stage 172, third processing stage 192, and the cacheload. Dotgen configuration updater 244 then updates the dotgen configuration in the DRAM and sends a job request done message to job request arbiter 230. Job request arbiter 230 then passes the job request done message to the original source of the job request (i.e., bit scanner 208 through communication link 214, bit scanner 224 through communication 228, or the nozzle sequencer through communication link 252).

Figure 4:
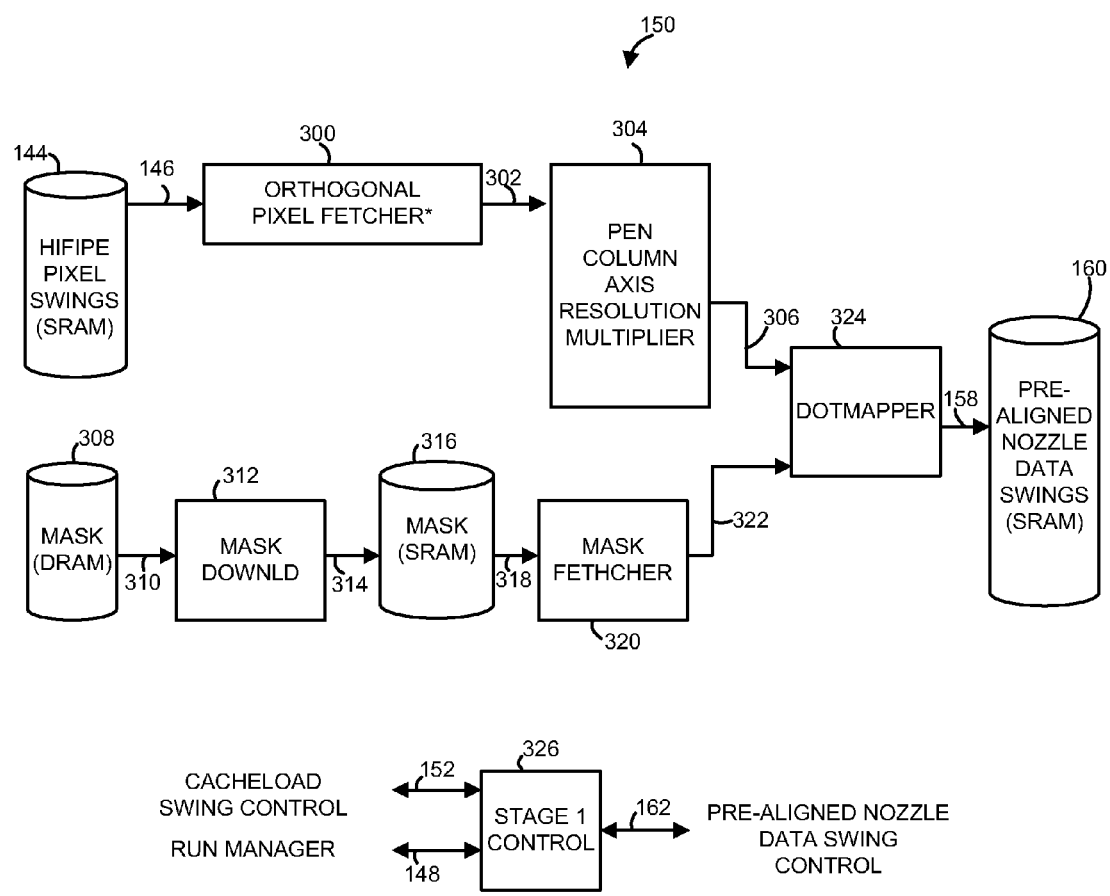
FIG. 4 is a block diagram illustrating one example of a first processing stage.

FIG. 4 is a block diagram illustrating one example of first processing stage 150. First processing stage 150 includes memory 144, an orthogonal pixel fetcher 300, a pen column axis resolution multiplier 304, a memory 308, a mask downloader 312, a memory 316, a mask fetcher 320, a dotmapper 324, memory 160, and a first processing stage controller 326. As previously described above, memory 144 is an SRAM for storing hifipe pixel data in hifipe pixel swings, and memory 160 is an SRAM for storing pre-aligned nozzle data in pre-aligned nozzle data swings. Memory 308 is a DRAM for storing masks, and memory 316 is an SRAM for storing downloaded masks. In one example, memories 308 and 316 provide memory 156 previously described and illustrated with reference to FIG. 2.

Memory 144 is communicatively coupled to orthogonal pixel fetcher 300 through communication link 146 for passing hifipe pixel data to orthogonal pixel fetcher 300. Orthogonal pixel fetcher 300 is communicatively coupled to pen column axis resolution multiplier 304 through a communication link 302. Pen column axis resolution multiplier 304 is communicatively coupled to dotmapper 324 through a communication link 306.

Memory 308 is communicatively coupled to mask downloader 312 through a communication link 310. Mask downloader 312 is communicatively coupled to memory 316 through a communication link 314. Memory 316 is communicatively coupled to mask fetcher 320 through a communication link 318. Mask fetcher 320 is communicatively coupled to dotmapper 324 through a communication link 322. Dotmapper 324 is communicatively coupled to memory 160 through communication link 158.

First processing stage controller 326 communicates with the cacheload swing control through a communication link 152, with run manager 130 (FIGS. 2 and 3) through communication link 148, and with pre-aligned nozzle data swing control 164 (FIG. 2) through communication link 162. First processing stage controller 326 receives work orders from the run manager, controls the execution of the work orders, and provides work order done messages to the run manager. In addition, first processing stage controller 326 sets which swing of the cacheload swings and which swing of the pre-aligned nozzle data swings to use for data production and consumption.

First processing stage 150 fetches pixels from the hifipe pixel swings in memory 144 and processes the pixel data to provide pre-aligned nozzle data. The pre-aligned nozzle data are the binary firing states (i.e., dots) of the nozzles prior to alignment. The pixel data input to first processing stage 150 is organized in orthogonal raster words, which are described below with reference to FIG. 7B. In one example, first processing stage 150 performs resolution multiplication, pixel discard, disabling of pixels, masking, and dot counting.

Orthogonal pixel fetcher 300 retrieves the pixel data from one swing of the hifipe pixel swings in memory 144. The pixel data is retrieved in the order of nozzle axis major (i.e., column major) from nozzle 0 to nozzle n−1, where "n" is the number of nozzles. If there is no pen column resolution multiplier, then nozzle 0 in the hifipe pixel swing maps to nozzle 0 within orthogonal pixel fetcher 300. If the multiplier is two, nozzle 0 in the hifipe pixel swing maps to nozzles 0 and 1 within orthogonal pixel fetcher 300. In one example, 32 pixels are fetched in each operation of orthogonal pixel fetcher 300. At the bottom of the column, if the number of nozzles is not a multiple of 32, dummy undefined pixels will be fetched but not used. Orthogonal pixel fetcher 300 then moves along the print sweep axis from the most significant bit of the raster word to the least significant bit of the raster word if there is no resolution multiplication along the print sweep axis. In one example, the 32 pixels retrieved in each operation are stored in a First In First Out (FIFO) register to be read by pen column axis resolution multiplier 304.

Pen column axis resolution multiplier 304 retrieves sets of 32 pixels from the FIFO register of orthogonal pixel fetcher 300 for each operation. The 32 pixels may be multiplied by a factor of 0.5, 1.0, 1.5, 2, 3, or 4 such that the 32 pixels may be expanded to as many as 128 pixels. After pixel expansion, the first few expanded pixels may be discarded. Since some of the expanded pixels may be mapped to different pen columns in a print bar, the expanded pixels that do not belong to the pen column for the run are discarded. In one example, up to three pixels may be discarded.

After discarding the excess pixels, pen column axis resolution multiplier 304 selects 32 pixels. Due to pixel discard, a partial set of less than 32 pixels may be selected. A pixel packer FIFO is used to accept input of 1 to 32 pixels and output 32 pixels. At the end of a pen column, if the pen column is not a multiple of 32, a dummy rounding off write may be made to the pixel packer FIFO. The output set of 32 pixels from the pixel packer FIFO may be down sampled to 16 pixels. The output of 16 pixels are then sent from pen column axis resolution multiplier 304 to dotmapper 324.

Once per run, mask downloader 312 downloads the mask from memory 308 into memory 316. Iterative reads of the mask are performed on the copy in memory 316. Mask fetcher 320 retrieves the mask from memory 316 and provides the mask to dotmapper 324. Mask fetcher 320 provides 16 mask dots corresponding to the 16 output pixels from pen column axis resolution multiplier 304.

Dotmapper 324 receives both the pixel and mask streams to provide an output stream of binary nozzle data. In one example, 16 sets of pixels and mask dots, each three bits wide, are converted into binary nozzle data. The output from dotmapper 324 is a set of 16 nozzle data, which are collected into a 64 bit register and then written into one swing of the pre-aligned nozzle data swings in memory 160.

Figure 5:
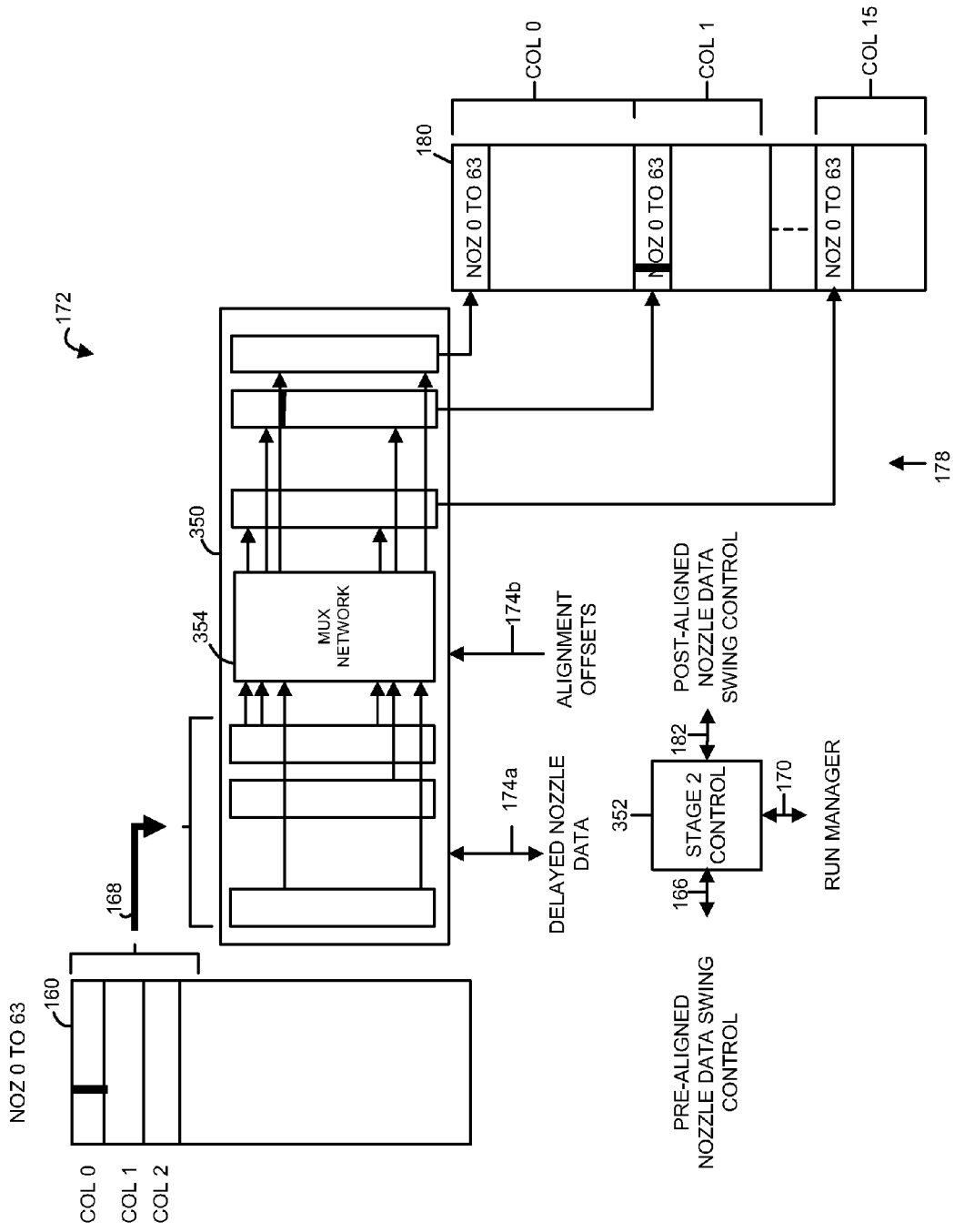
FIG. 5 is a block diagram illustrating one example of a second processing stage.

FIG. 5 is a block diagram illustrating one example of second processing stage 172. Second processing stage 172 includes memory 160, alignment circuit 350, memory 180, and second processing stage controller 352. As previously described, memory 160 is an SRAM for storing pre-aligned nozzle data in pre-aligned nozzle data swings, and memory 180 is an SRAM for storing post-aligned nozzle data in post-aligned nozzle data swings.

Memory 160 is communicatively coupled to circuit 350 through communication link 168. Circuit 350 receives delayed nozzle data through communication link 174a and alignment offsets through communication link 174b. In one example, communication links 174a and 174b provide communication link 174 previously described and illustrated with reference to FIG. 2. Circuit 350 is communicatively coupled to memory 180 through communication link 178.

Second processing stage controller 352 communicates with pre-aligned nozzle data swing control 164 (FIG. 2) through a communication link 166, with run manager 130 (FIGS. 2 and 3) through communication link 170, and with post-aligned nozzle data swing control 184 (FIG. 2) through communication link 182. Second processing stage controller 352 receives work orders from the run manager, controls the execution of the work orders, and provides work order done messages to the run manager. In addition, second processing stage controller 352 sets which swing of the pre-aligned nozzle data swings and which swing of the post-aligned nozzle data swings to use for data production and consumption.

The pre-aligned nozzle data is stored in the pre-aligned nozzle data swings in memory 160 in a hybrid of column major and row major order as follows:

{column 0 : nozzles 0, 1, 2, ...63}
{column 1 : nozzles 0, 1, 2, ...63}
{...}
{last column : nozzles 0, 1, 2, ...63}
{column 0 : nozzles 64, 65, 66, ...127}
{column 1 : nozzles 64, 65, 66, ...127}
{...}.

Alignment circuit 350 receives the pre-aligned nozzle data from memory 160 and the delayed nozzle data and alignment offsets. Alignment circuit 350 includes a multiplexer network 354 for aligning the pre-aligned nozzle data based on the alignment offsets and the delayed nozzle data to provide post-aligned nozzle data. In one example, as previously described above with reference to FIG. 2, alignment circuit 350 fetches and processes the pre-aligned nozzle data in row major order for a single nozzle for 16 columns before moving down to the next nozzle. Alignment circuit 350 writes the post-aligned nozzle data to memory 180.

The post-aligned nozzle data is stored in one swing of the post-aligned nozzle data swings in memory 180 in a column major order as follows:

{column 0 : nozzles 0, 1, 2, ...63}
{column 0 : nozzles 64, 65, 66, ...127}
{...}
{column 0 : nozzles N-63, ...N, where "N" is the number of nozzles}
{column 1 : nozzles 0, 1, 2, ...63}
{column 1 : nozzles 64, 65, 66, ...127}
{...}.

Figure 6:
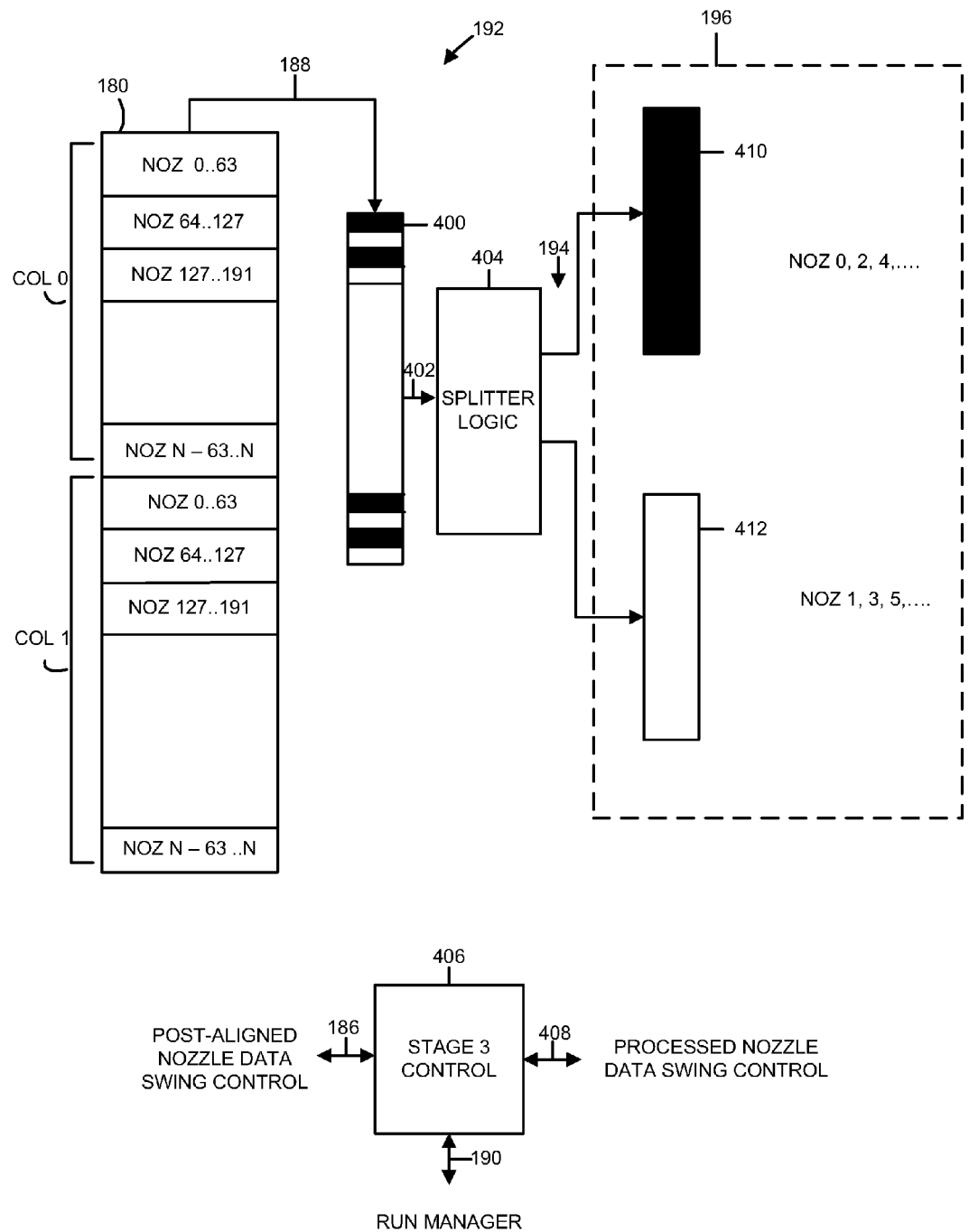
FIG. 6 is a block diagram illustrating one example of a third processing stage.

FIG. 6 is a block diagram illustrating one example of third processing stage 192. Third processing stage 192 includes memory 180, register 400, splitter logic 404, memory 196, and third processing stage controller 406. As previously described, memory 180 is an SRAM for storing post-aligned nozzle data in post-aligned nozzle data swings, and memory 196 is a DRAM for storing processed nozzle data in processed nozzle data swings. Memory 180 is communicatively coupled to register 400 through communication link 188. Register 400 is communicatively coupled to splitter logic 404 through a communication link 402. Logic splitter 404 is communicatively coupled to memory 196 through communication link 194.

Third processing stage controller 406 communicates with the post-aligned nozzle data swing control 184 (FIG. 2) through communication link 186, with run manager 130 (FIGS. 2 and 3) through communication link 190, and with a processed nozzle data swing control through a communication link 408. Third processing stage controller 406 receives work orders from the run manager, controls the execution of the work orders, and provides work order done messages to the run manager. In addition, third processing stage controller 406 sets which swing of the post-aligned nozzle data swings and which swing of the processed nozzle data swings to use for data production and consumption.

Register 400 receives post-aligned nozzle data from memory 180 and passes the post-aligned nozzle data to splitter logic 404. Splitter logic 404 splits the post-aligned nozzle data into even and odd nozzles for storing in separate swings in memory 196. Memory 196 stores the nozzle data for even numbered nozzles in swing 410 and nozzle data for odd numbered nozzles in swing 412. The processed nozzle data in memory 196 is then sent to the pens.

FIG. 7A is a table 500 illustrating one example of hifipe raster words. In one example, each hifipe raster word is a 128 bit word made up of 16 raster bytes RB0 to RB15. RB15 is the most significant pixel and RB0 is the least significant pixel. A raster word may hold 32, 64, or 128 pixels depending on whether each pixel includes 1, 2, or 3 bits, respectively. All pixels in a raster word are of the same plane. An orthogonal raster word as illustrated in table 500 stores a row of pixels. The 128 bit raster word is aligned to a 16 byte address boundary. Rb[a,b] denotes raster byte "b" of raster word "a." Therefore, as illustrated in table 500, RB15 of nozzle 0 is stored at byte address 0, RB14 of nozzle 0 is stored at byte address 1, RB15 of nozzle 1 is stored at byte address 16, and RB14 of nozzle 1 is stored at byte address 17, etc. The hifipe raster words are generated by electronic controller 118 (FIG. 1) from host data that has been preprocessed by electronic controller 118 for halftoning and color matching prior to processing in raster dotgen 122.

FIG. 7B is a table 550 illustrating one example of hifipe pixel swings. In one example, the hifipe pixel swings illustrated in table 550 provide the hifipe pixel swings in memory 144 previously described and illustrated with reference to FIG. 2. Each hifipe pixel swing is a single orthogonal swing buffer. Each orthogonal swing buffer includes 16 sub swings 0, 1, 2, ... 15. Each sub swing stores the corresponding raster word bytes. For example, raster word byte 0 of the raster words of a pen column are stored in sub swing 0. Accordingly, the 128 bit hifipe raster word is stored in 16 sub swings.

Table 550 illustrates 40 raster words stored in the orthogonal sub swings. Rb[a,b] denotes raster byte "b" of raster word "a." In table 550, "N" is the sub swing size and is a multiple of 32 bytes. There are two sets of orthogonal pixel swings, and the size of the sub swings and the number of sub swings in both sets are the same. The orthogonal pixel swings are sized to accommodate the largest pen column to be encountered in the print sweep. In one example, the cacheload populates the orthogonal pixel swings based on the raster words.

FIG. 8 is a table 600 illustrating one example of the format of a pre-aligned nozzle data swing buffer. In one example, the pre-aligned nozzle data swing buffer illustrated in table 600 provides the pre-aligned nozzle data swings in memory 160 previously described and illustrated with reference to FIG. 2. Table 600 illustrates an example that includes 150 nozzles. The nozzle axis is vertical such that columns are parallel to the nozzle axis. In one example, the pre-aligned nozzle data swing buffer stores a maximum of 16 columns of data regardless of the number of nozzles. Sets of 16 columns are toggled between two swing buffers. The last swing of a run may have less than 16 columns.

The pre-aligned nozzle data is stored in a hybrid of column major and row major order in which data for a first group of nozzles (e.g., nozzles 0 to 63) is stored for each column in a set of columns (e.g., columns 0 to 15), followed by data for a second group of nozzles (e.g., nozzles 64 to 127), which is stored for each column in the set of columns. The storage of the pre-aligned nozzle data continues until the data for all the nozzles is stored (e.g., 150 nozzles).

Each 64 bits or 8 bytes of the pre-aligned nozzle data swing buffer stores 64 dots for 64 nozzles. The start nozzle is at the most significant bit of the first byte and the end nozzle is at the least significant bit of the last byte. In this example, nozzle 0 is at byte 0, bit 7, nozzle 1 is at byte 0, bit 6, ... nozzle 63 is at byte 7, bit 0, etc. One swing is illustrated in table 600. The other swing has the same format. The size of each swing is sized to accommodate the maximum number of nozzles in the print sweep and background preload.

As first processing stage 150 (FIG. 2), processes and generates output dots in nozzle axis major order (i.e., column major order), first processing stage 150 writes one column of 64 dots at a time in the following byte address order: {0 ... 7, 128 ... 135, 256 ... 263, ... 8 ... 15, 136 ... 143, 264 ... 271, etc.}. Write accesses of eight consecutive bytes (e.g., 0 ... 7) are completed in a single write cycle of 64 bits.

As second processing stage 172 (FIG. 2) processes input dots in print sweep axis major order (i.e., row major order), second processing stage 172 fetches four columns of 64 dots in the following byte address order: {0 ... 31, 32 ... 63, 64 ... 95, 96 ... 127, 128 ... 159, etc.}. Read accesses of 32 consecutive bytes (e.g. 0 ... 31) are completed in a single read cycle of 256 bits.

Figure 9:
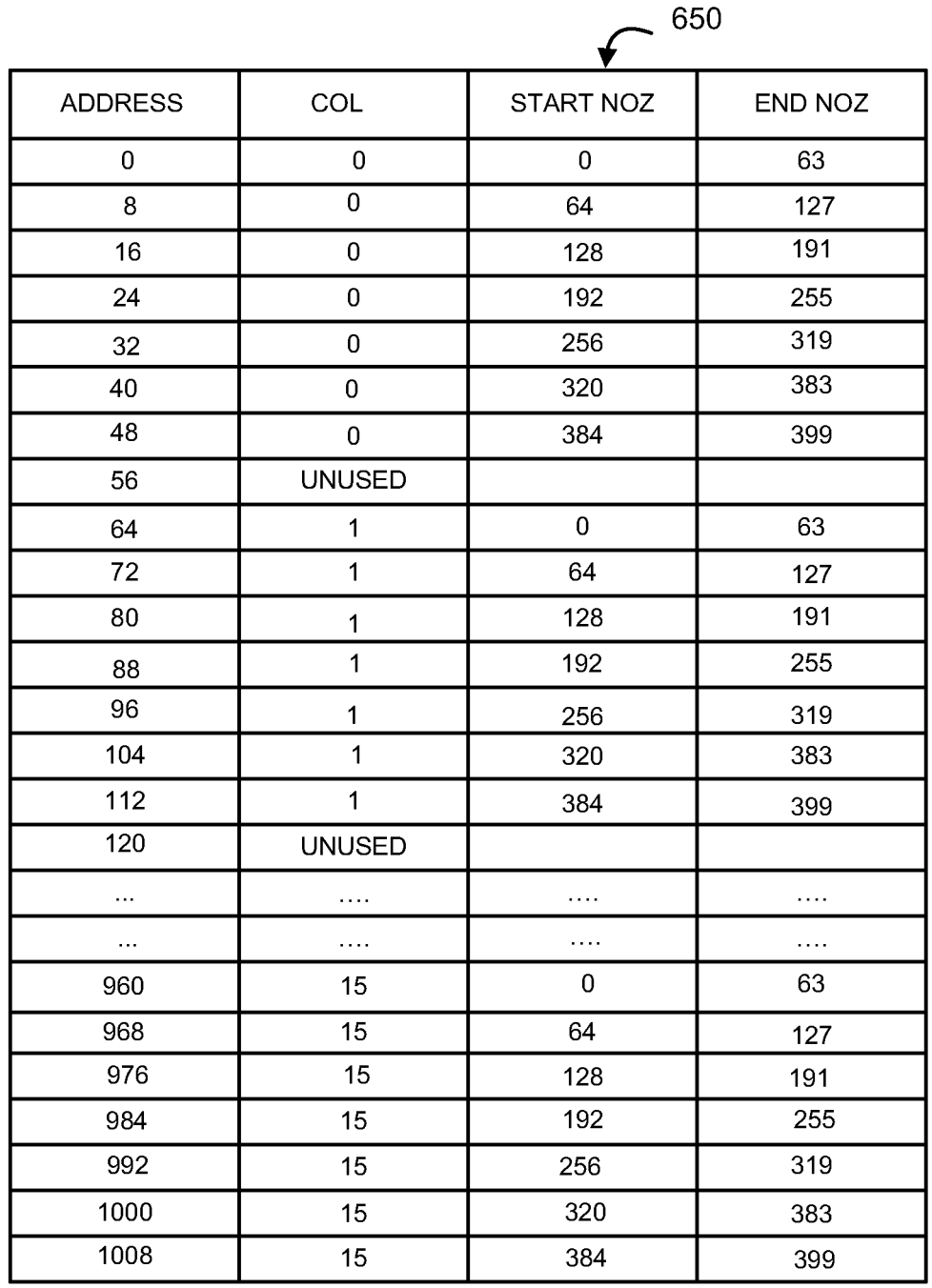
FIG. 9 is a table illustrating one example of the format of a post-aligned nozzle data swing buffer.

FIG. 9 is a table 650 illustrating one example of the format of a post-aligned nozzle data swing buffer. In one example, the post-aligned nozzle data swing buffer illustrated in table 650 provides the post-aligned nozzle data swings in memory 180 previously described and illustrated with reference to FIG. 2. Table 650 illustrates an example format for storing nozzle data for a 400 nozzle dotgen in a post-aligned nozzle data buffer. In one example, the post-aligned nozzle data buffer is aligned to a 32 byte address boundary. There are two swing buffers, and in each swing buffer, 16 data columns are stored. The size of each swing buffer is sized to accommodate the maximum number of nozzles in the print sweep and the background preload.

As second processing stage 172 (FIG. 2) processes and generates output dots in print sweep axis major order (i.e., row major order), second processing stage 172 writes one column of 64 dots in the following byte address order: {0 ... 7, 64 ... 71, 128 ... 135, ..., 960 ... 967, 8 ... 15, etc.}. Write accesses of eight consecutive bytes (e.g., 0 ... 7) are completed in a single write cycle of 64 bits.

As third processing stage 192 (FIG. 2) processes input dots in nozzle axis major order (i.e., column major order), third processing stage 192 fetches a single column of 256 dots in the following byte address order: {0 ... 31, 32 ... 63, 64 ... 95, 96 ... 127, 128 ... 159, etc.}. Read accesses of 32 consecutive bytes (e.g. 0 ... 31) are completed in a single read cycle of 256 bits.

Figure 10:
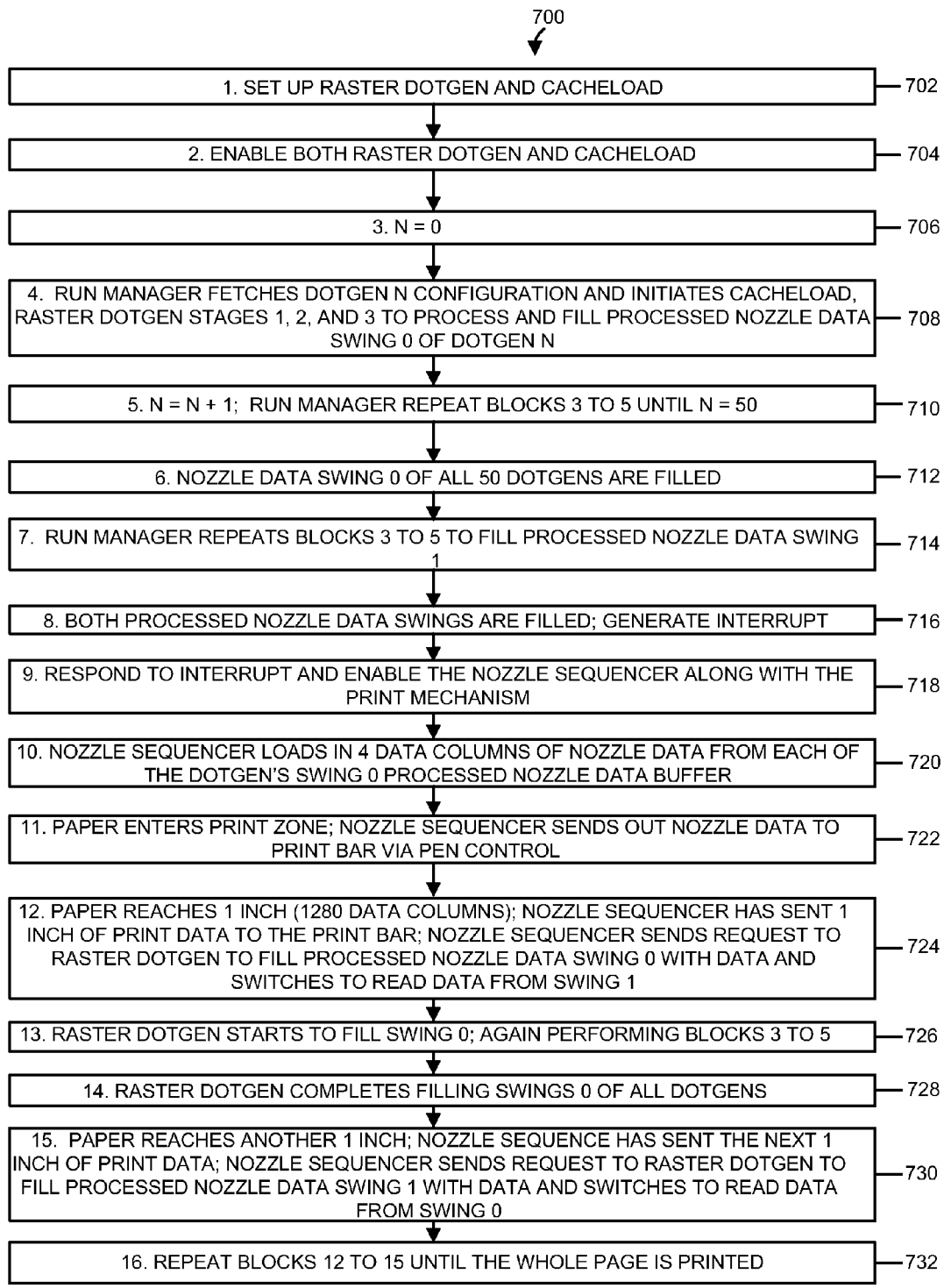
FIG. 10 is a flow diagram illustrating one example of the operation of the raster dotgen in real time mode.

FIG. 10 is a flow diagram illustrating one example of a process 700 for the operation of raster dotgen 122 (FIG. 2) in real time mode. In this example, pixel data for a print bar of 50 pen columns is processed. Fifty dotgens are allocated to produce the nozzle data. Prior to process 700, a page worth of hifipe pixels are available. In this example, raster dotgen 122 (FIG. 1) is set to run in real time mode with a nozzle data swing size of 1 inch (e.g., 1280 data columns at 1200 dpi). Therefore, the run length in this example is 1280 data columns.

At 702, raster dotgen 122 and the cacheload are set up. At 704, both raster dotgen 122 and the cacheload are enabled. At 706, "N" is set to 0, where "N" indicates a dotgen. At 708, run manager 130 fetches the dotgen "N" configuration and initiates the cacheload, first processing stage 150, second processing stage 172, and third processing stage 192 to process and fill processed nozzle data swing 0 (e.g., of memory 196 (FIG. 2)) of dotgen "N." At 710, "N" is set to N+1, and the run manager repeats blocks three to five (i.e., 706, 708, 710) until N=50. At 712, the processed nozzle data swing 0 of all 50 dotgens are filled. At 714, run manager 130 repeats blocks three to five to fill processed nozzle data swing 1. At 716, both processed nozzle data swings are filled and an interrupt is generated. At 718, in response to the interrupt, the nozzle sequencer along with the print mechanism are enabled.

At 720, the nozzle sequencer loads in four columns of nozzle data from each of the dotgen's swing 0 processed nozzle data buffer. At 722, paper enters the print zone, and the nozzle sequencer sends out the nozzle data to the print bar via a pen control. At 724, the paper reaches one inch (e.g., 1280 data columns), the nozzle sequencer has sent one inch of print data to the print bar, and the nozzle sequencer sends a request to raster dotgen 122 to fill processed nozzle data swing 0 with data. The nozzle sequencer also switches from processed nozzle data swing 0 to processed nozzle data swing 1 to read data from processed nozzle data swing 1. At 726, raster dotgen 122 starts to fill processed nozzle data swing 0 by repeating blocks 3 to 5. At 728, raster dotgen 122 completes filling processed data swing 0 of all dotgens. At 730, the paper reaches another one inch, the nozzle sequencer has sent the next one inch of print data, and the nozzle sequencer sends a request to raster dotgen 122 to fill processed nozzle data swing 1 with data. The nozzle sequencer also switches from processed nozzle data swing 1 to processed nozzle data swing 0 to read data from processed nozzle data swing 0. At 732, blocks 10 to 15 (i.e., 720, 722, 724, 726, 728, 730) repeat until the whole page is printed.

Figure 11:
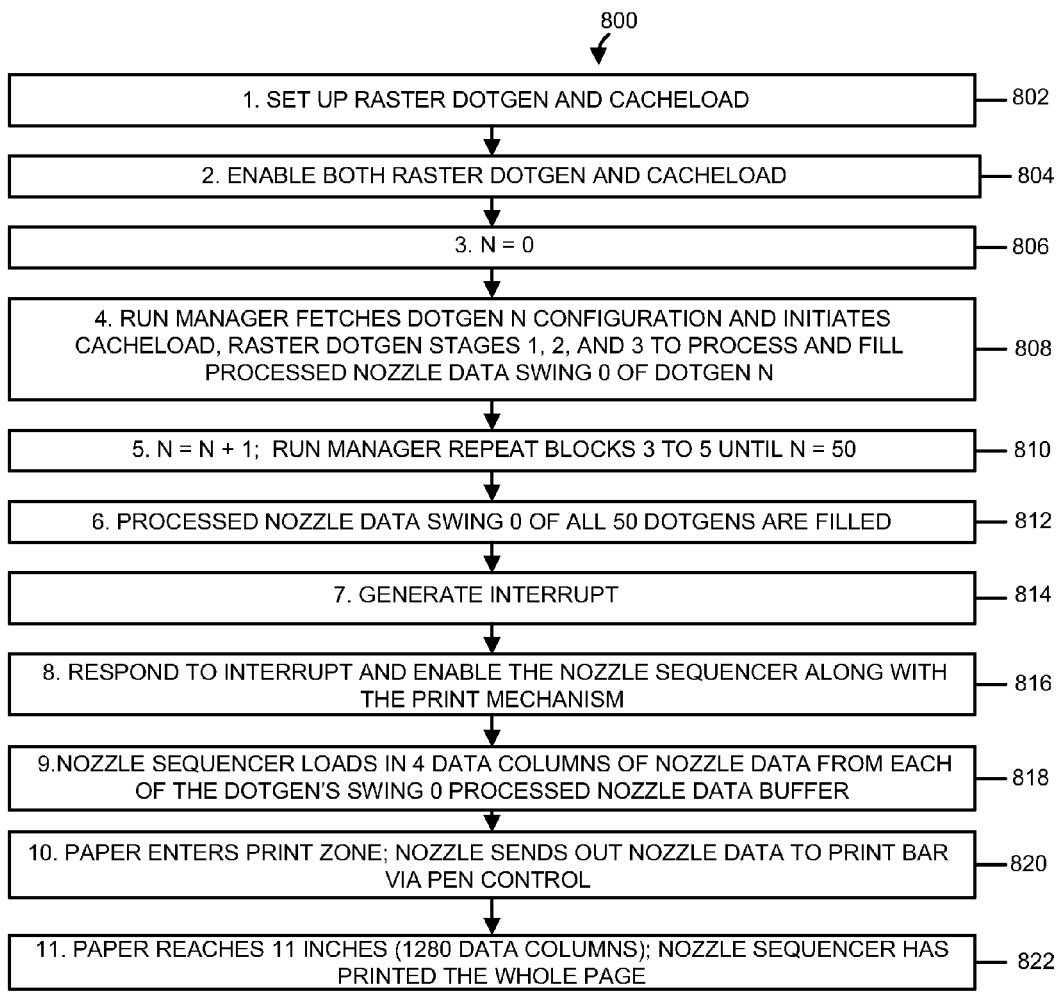
FIG. 11 is a flow diagram illustrating one example of the operation of the raster dotgen in non-real time mode.

FIG. 11 is a flow diagram illustrating one example of a process 800 for the operation of raster dotgen 122 (FIG. 2) in non-real time mode. In non-real time mode, the run length is programmed to the width of the whole page. In this example, the page is in landscape orientation with a vertical nozzle axis. One swing is preloaded and the swing is sized to accommodate the whole page. In this example, the run length is 11 inches by 1280 columns.

At 802, raster dotgen 122 and the cacheload are set up. At 804, both raster dotgen 122 and the cacheload are enabled. At 806, "N" is set to 0, where "N" indicates a dotgen. At 808, run manager 130 fetches the dotgen "N" configuration and initiates the cacheload, first processing stage 150, second processing stage 172, and third processing stage 192 to process and fill processed nozzle data swing 0 of dotgen "N." At 810, "N" is set to N+1, and run manager 122 repeats blocks three to five (i.e., 806, 808, 810) until N=50. At 812, the processed nozzle data swing 0 of all 50 dotgens are filled. At 814, an interrupt is generated. At 816, in response to the interrupt, the nozzle sequencer along with the print mechanism are enabled.

At 818, the nozzle sequencer loads in four columns of nozzle data from each of the dotgen's swing 0 processed nozzle data buffer. At 820, paper enters the print zone, and the nozzle sequencer sends out the nozzle data to the print bar via a pen control. At 822, the paper reaches 11 inches (e.g., 1280 data columns) and the nozzle sequencer has printed the whole page.

Although specific examples have been illustrated and described herein, it will be appreciated by those of ordinary skill in the art that a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. A printer comprising:
a first swing buffer to store pixel data;
a first processing stage to process the pixel data in a nozzle axis major order to provide pre-aligned nozzle data;
a second swing buffer to store the pre-aligned nozzle data;
a second processing stage to process the pre-aligned nozzle data in a print sweep axis major order to provide post-aligned nozzle data;
a third swing buffer to store the post-aligned nozzle data; and
a third processing stage to process the post-aligned nozzle data in the nozzle axis major order to provide processed nozzle data.

2. The printer of claim 1, wherein the first swing buffer stores the pixel data in a plurality of sub swings.

3. The printer of claim 1, wherein the second swing buffer stores the pre-aligned nozzle data in a hybrid of column major and row major order.

4. The printer of claim 1, wherein the third swing buffer stores the post-aligned nozzle data in a nozzle axis major order.

5. The printer of claim 1, further comprising:
a fourth swing buffer to store the processed nozzle data.

6. The printer of claim 1, further comprising:
a run manager to control the first processing stage, the second processing stage, and the third processing stage based on dot generator configurations.

7. A system comprising:
a first memory to store pixel data;
a first circuit coupled to the first memory, the first circuit to receive the pixel data from the first memory and to perform rotation, resolution multiplication, and masking of the pixel data in a nozzle axis major order to provide pre-aligned nozzle data;
a second memory to store the pre-aligned nozzle data;
a second circuit coupled to the second memory, the second circuit to receive the pre-aligned nozzle data from the second memory and to perform alignment of the pre-aligned nozzle data in a print sweep axis major order to provide post-aligned nozzle data;
a third memory to store the post-aligned nozzle data; and
a third circuit coupled to the third memory, the third circuit to receive the post-aligned nozzle data from the third memory and to perform nozzle splitting of the post-aligned nozzle data in the nozzle axis major order to provide processed nozzle data.

8. The system of claim 7, wherein the first memory stores the pixel data in a swing buffer having a plurality of sub swing buffers, each sub swing buffer for a column of nozzles and storing corresponding bytes of a raster word.

9. The system of claim 7, wherein the second memory stores the pre-aligned nozzle data in a hybrid of column major and row major order.

10. The system of claim 7, wherein the third memory stores the post-aligned nozzle data in a column major order.

11. An application-specific integrated circuit comprising:
a first Static Random Access Memory (SRAM) to store pixel data;
a first circuit coupled to the first SRAM, the first circuit to fetch the pixel data from the first memory and to perform rotation, resolution multiplication, and masking of the pixel data in a nozzle axis major order to provide pre-aligned nozzle data;
a second SRAM to store the pre-aligned nozzle data;
a second circuit coupled to the second SRAM, the second circuit to fetch the pre-aligned nozzle data from the second memory and to perform alignment of pre-aligned nozzle data in a print axis major order to provide post-aligned nozzle data;
a third SRAM to store the post-aligned nozzle data; and
a third circuit coupled to the third SRAM, the third circuit to fetch the post-aligned nozzle data from the third memory and to perform nozzle splitting of the post-aligned nozzle data in the nozzle axis order to provide processed nozzle data.

12. The application-specific integrated circuit of claim 11, further comprising:

a fourth circuit to control the first circuit, the second circuit, and the third circuit based on dot generator configurations.

13. The application-specific integrated circuit of claim 11, wherein the first SRAM stores the pixel data in 16 sub swing buffers, where each of the 16 sub swing buffers stores corresponding bytes of 16 byte raster words for a plurality of nozzles.

14. The application-specific integrated circuit of claim 11, wherein the second SRAM stores the pre-aligned nozzle data in an order in which pre-aligned nozzle data for a first group of nozzles for each column of a set of columns is stored followed by pre-aligned nozzle data for a second group of nozzles for each column of the set of columns.

15. The application-specific integrated circuit of claim 11, wherein the third SRAM stores the post-aligned nozzle data in a column major order.

* * * * *